US012692795B2

(12) United States Patent
Lutjen et al.

(10) Patent No.: US 12,692,795 B2
(45) Date of Patent: Jul. 28, 2026

(54) GAS TURBINE ENGINE TURBINE SECTION WITH AXIAL SEAL

(71) Applicant: Raytheon Technologies Corporation, Farmington, CT (US)

(72) Inventors: Paul M. Lutjen, Kennebunkport, ME (US); Morely S. Sherman, Biddeford, ME (US)

(73) Assignee: RTX Corporation, Farmington, CT (US)

( * ) Notice: Subject to any disclaimer, the term of this patent is extended or adjusted under 35 U.S.C. 154(b) by 264 days.

(21) Appl. No.: 17/977,573

(22) Filed: Oct. 31, 2022

(65) Prior Publication Data

US 2024/0141798 A1      May 2, 2024

(51) Int. Cl.
| | |
|---|---|
| *F01D 11/00* | (2006.01) |
| *F01D 11/08* | (2006.01) |
| *F02C 7/18* | (2006.01) |
| *F02C 7/28* | (2006.01) |
| *F01D 25/24* | (2006.01) |

(52) U.S. Cl.
CPC .......... *F01D 11/003* (2013.01); *F01D 11/005* (2013.01); *F01D 11/08* (2013.01); *F02C 7/18* (2013.01); *F02C 7/28* (2013.01); *F01D 25/246* (2013.01); *F05D 2240/11* (2013.01); *F05D 2240/55* (2013.01); *F05D 2300/6033* (2013.01)

(58) Field of Classification Search
CPC ...... F01D 11/003; F01D 11/005; F01D 11/08; F01D 25/246; F02C 7/18; F02C 7/28; F05D 2240/11; F05D 2240/55
See application file for complete search history.

(56) References Cited

U.S. PATENT DOCUMENTS

| | | | | |
|---|---|---|---|---|
| 5,934,687 | A * | 8/1999 | Bagepalli | F16J 15/122 277/653 |
| 10,100,660 | B2 * | 10/2018 | Sippel | F01D 11/08 |
| 10,202,863 | B2 | 2/2019 | Davis et al. | |
| 10,550,706 | B2 | 2/2020 | Lutjen et al. | |
| 11,073,034 | B2 | 7/2021 | Lutjen et al. | |
| 2006/0082074 | A1 * | 4/2006 | Synnott | F16J 15/0887 277/641 |
| 2013/0113168 | A1 | 5/2013 | Lutjen et al. | |

(Continued)

FOREIGN PATENT DOCUMENTS

| | | |
|---|---|---|
| EP | 3249170 B1 | 2/2019 |
| EP | 2998520 B1 | 8/2021 |

OTHER PUBLICATIONS

European Search Report for EP Application No. 23207173.8 dated Mar. 4, 2024.

*Primary Examiner* — Phutthiwat Wongwian
*Assistant Examiner* — Rene D Ford
(74) *Attorney, Agent, or Firm* — Carlson, Gaskey & Olds, P.C.

(57) ABSTRACT

There is an axial gap between a leading edge of one of a blade outer air seal and a stator vanes and a trailing edge of the other. A feather seal is positioned to span the axial gap. The feather seal has axially spaced curved portions, with one of the curved portions in contact with a surface of the blade outer air seal and another of the curved portions being in contact with a surface of the stator vane. A pressure differential forces the feather seal into contact with the sealing surfaces and the contact being point contact due to the curved portions.

2 Claims, 3 Drawing Sheets

(56) References Cited

U.S. PATENT DOCUMENTS

| 2016/0090853 | A1 | | 3/2016 | Lutjen et al. | |
| 2016/0290157 | A1 | * | 10/2016 | Ning | F01D 9/065 |
| 2017/0342849 | A1 | | 11/2017 | Rice et al. | |
| 2022/0090510 | A1 | * | 3/2022 | Asti | F01D 11/18 |

* cited by examiner

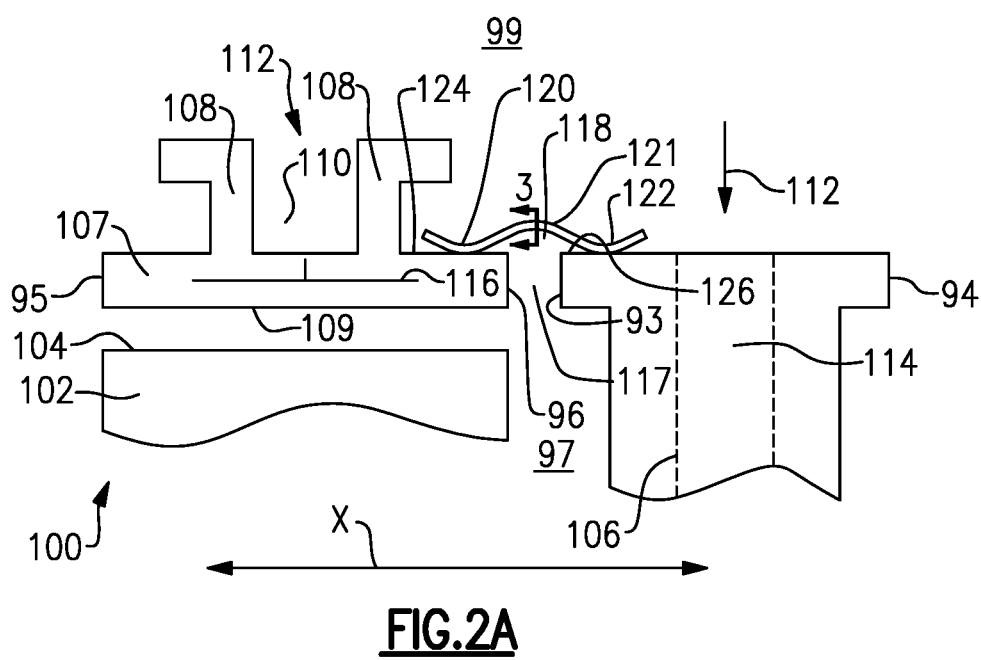
FIG.2A
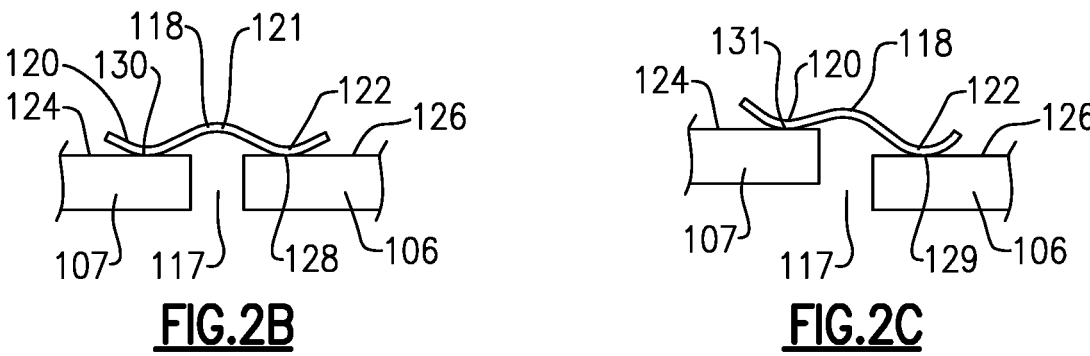
FIG.2B
FIG.2C
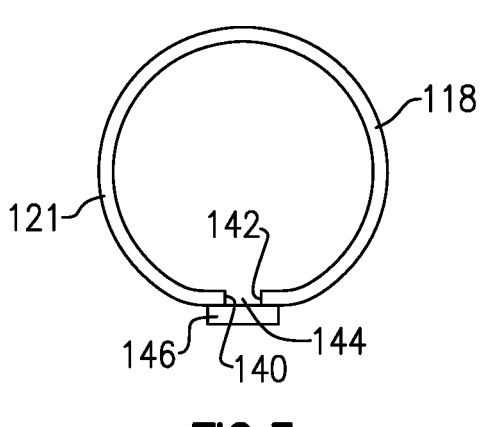
FIG.3

GAS TURBINE ENGINE TURBINE SECTION WITH AXIAL SEAL

BACKGROUND OF THE INVENTION

This application relates to an axial seal in a turbine section of a gas turbine engine which will seal an axial gap between a blade outer air seal and a stator vane.

Gas turbine engines are known, and typically include a fan delivering air into a bypass duct as propulsion air. The fan also delivers air into a compressor where it is mixed with fuel and ignited. Products of this combustion pass downstream over turbine rotors, driving them to rotate. The turbine rotors in turn rotate the fan and compressor rotors.

It is known that the turbine section will see very high temperatures from the products of combustion. As such, it is known to provide cooling air to components in the turbine section. Typically there are rows or rotating turbine blades and spaced on either side of rows of stator vanes. Further, to reduce leakage around the turbine blades, blade outer air seals ("BOAS") are placed radially outwardly of the turbine blades. Cooling air is supplied to all three of these components.

The cooling air is typically taken from the compressor section of the gas turbine engine, and thus it is at a relatively high pressure. When the cooling air is supplied to the BOAS and/or the stator vanes, there is a relatively high pressure radially outward of these components. This relatively high pressure is significantly higher than the pressure of the products of combustion radially inward of the components. As such, there can be leakage between the radially outer location to the radially inner location. The leakage is undesirable as it decreases the efficiency.

SUMMARY OF THE INVENTION

In a featured embodiment, a gas turbine engine includes a compressor, a combustor and a turbine section. The turbine section includes at least one row of turbine blades rotating about a rotational axis and at least one row of stator vanes axially spaced from the at least one row of turbine blades. A blade outer air seal is positioned radially outward of a radially outer tip of the at least one row of rotating turbine blades. Each of the blade outer air seals and the stator vanes have a leading edge and trailing edge. There is an axial gap between a leading edge of one of the blade outer air seals and the stator vanes and a trailing edge of the other. A feather seal is positioned to span the axial gap. The feather seal has axially spaced curved portions, with one of the curved portions in contact with a surface of the blade outer air seal and another of the curved portions being in contact with a surface of the stator vane. There is a connection to supply cooling air to a radially outer chamber radially outward of at least one of the blade outer air seal and the at least one row of stator vanes, such that there would be a pressure differential between the radially outer chamber and a combustion products chamber radially inward of the blade outer air seal and the stator vanes. The pressure differential forces the feather seal into contact with the sealing surfaces on the blade outer air seal and stator vane, and the contact being point contact due to the curved portion.

In another embodiment according to the previous embodiment, the blade outer air seal is formed of ceramic matrix composite.

In another embodiment according to any of the previous embodiments, the stator vanes are formed of a metal such that the blade outer air seal and the stator vanes have a different thermal coefficients of expansion.

In another embodiment according to any of the previous embodiments, the blade outer air seal and stator vane are formed of distinct materials, and due to the point contact the feather seal can adjust to accommodate distinct amounts of thermal expansion on the blade outer air seal and the stator vane.

In another embodiment according to any of the previous embodiments, the feather seal has two radially inward portions at each of two axial ends and a central portion curved radially outwardly and connecting the two radially inward curved portion. The radially inwardly extending curved portion provides the point contact with the surfaces on the blade outer air seal and the stator vane.

In another embodiment according to any of the previous embodiments, the feather seal extends for the majority of 360 degrees about the rotational axis, but has a circumferential gap over at least a portion of the feather seal across a portion of the 360 degrees about the rotational axis.

In another embodiment according to any of the previous embodiments, a seal tab spans the circumferential gap.

In another embodiment according to any of the previous embodiments, the feather seal has two mirrored generally c-shaped portion providing a radially inwardly extending curve to contact the surfaces on the blade outer air seal and the stator vane. Ends of the c-shaped portions are spaced from each other, and connected by an outer curved portion extending across a gap between the c-shaped mirrored portions and the outer curved portion having a generally radially inwardly extending portion.

In another embodiment according to any of the previous embodiments, the feather seal extends for the majority of 360 degrees about the rotational axis, but has a circumferential gap over at least a portion of the feather seal across a portion of the 360 degrees about the rotational axis.

In another embodiment according to any of the previous embodiments, a seal tab spans the circumferential gap.

In another embodiment according to any of the previous embodiments, the feather seal is formed of a sheet metal.

In another embodiment according to any of the previous embodiments, the stator vanes are formed of a metal such that the blade outer air seal and the stator vanes have a different thermal coefficients of expansion.

In another embodiment according to any of the previous embodiments, due to the point contact the feather seal can adjust to accommodate distinct amounts of thermal expansion on the blade outer air seal and the stator vane.

In another embodiment according to any of the previous embodiments, the feather seal has two radially inward portions at each of two axial ends and a central portion curved radially outwardly and connecting the two radially inward curved portion. The radially inwardly extending curved portion provides the point contact with the surfaces on the blade outer air seal and the stator vane.

In another embodiment according to any of the previous embodiments, the feather seal has two mirrored generally c-shaped portion providing a radially inwardly extending curve to contact the surfaces on the blade outer air seal and the stator vane. Ends of the c-shaped portions are spaced from each other, and connected by an outer curved portion extending across a gap between the c-shaped mirrored portions and the outer curved portion having a generally radially inwardly extending portion.

In another embodiment according to any of the previous embodiments, the feather seal extends for the majority of 360 degrees about the rotational axis, but has a circumferential gap over at least a portion of the feather seal across a portion of the 360 degrees about the rotational axis.

In another embodiment according to any of the previous embodiments, a seal tab spans the circumferential gap.

In another embodiment according to any of the previous embodiments, the feather seal has two radially inward portions at each of two axial ends and a central portion curved radially outwardly and connecting the two radially inward curved portion. The radially inwardly extending curved portion provides the point contact with the surfaces on the blade outer air seal and the stator vane.

In another embodiment according to any of the previous embodiments, the feather seal has two mirrored generally c-shaped portion providing a radially inwardly extending curve to contact the surfaces on the blade outer air seal and the stator vane. Ends of the c-shaped portions being spaced from each other, and connected by an outer curved portion extending across a gap between the c-shaped mirrored portions and the outer curved portion having a generally radially inwardly extending portion.

In another embodiment according to any of the previous embodiments, the feather seal is formed of a sheet metal.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 2A shows a portion of a turbine section of the gas turbine engine of FIG. 1.

FIG. 2B shows a sealing feature.

FIG. 2C shows a FIG. 2B sealing feature when there has been thermal expansion of components in the turbine section.

FIG. 3 is a cross-sectional view along line 3-3 of FIG. 2A.

DETAILED DESCRIPTION

Figure 1:
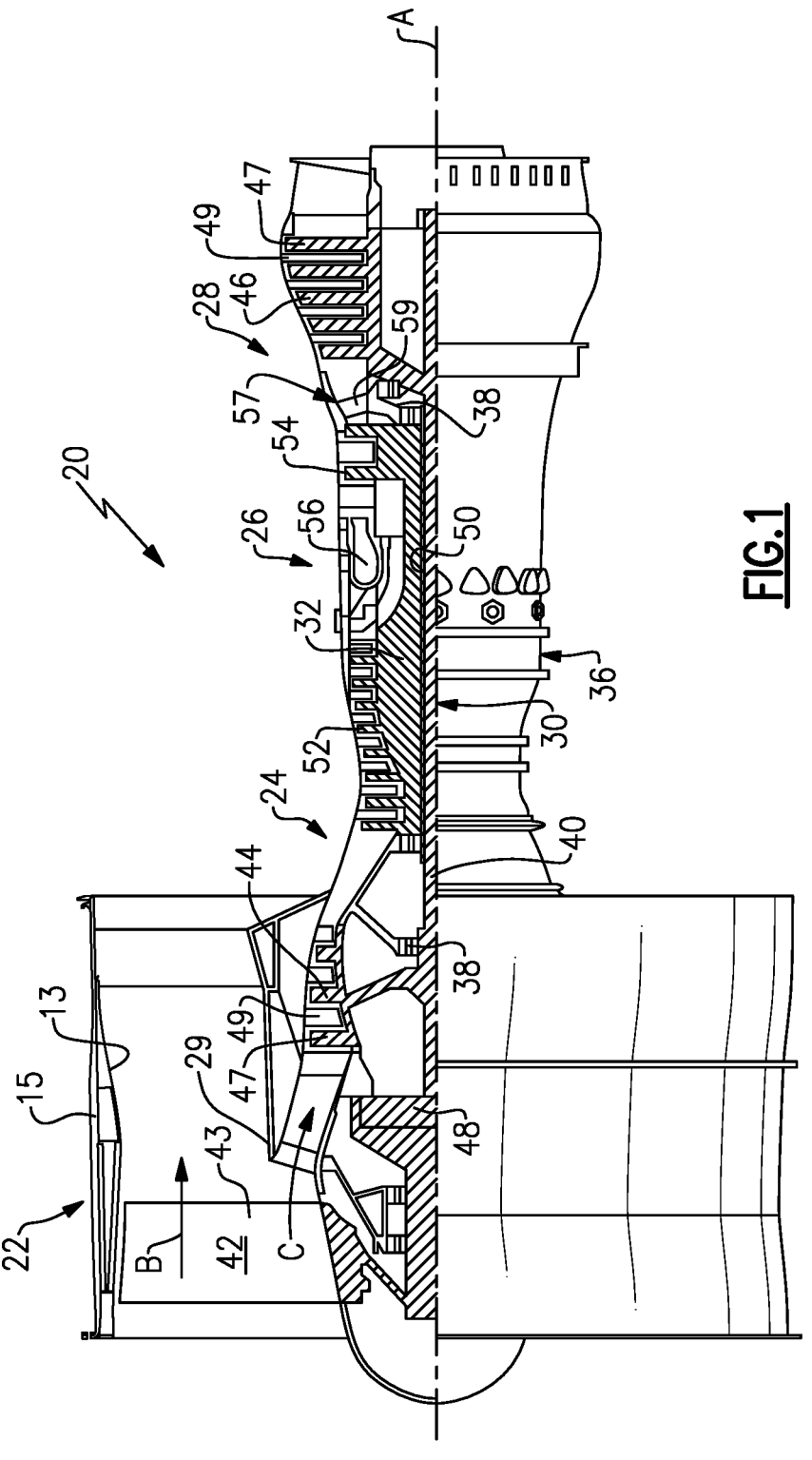
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

FIG. 2A shows a turbine section 100 such as may be found in a gas turbine engine like that shown in FIG. 1. As known, there are rows of rotating turbine blades 102 and alternating rows of stator vanes 106. A radially outer tip 104 of the turbine blades 102 is spaced by a blade outer air seal 107 ("BOAS") having an inner surface 109 closely spaced from the outer tip 104. The BOAS is intended to reduce leakage of products of combustion in a chamber 97 that might otherwise move around the blade outer air seal 102. The BOAS 107 has an upstream or leading edge 95 and a downstream or trailing edge 96. The stator vane 106 has an upstream or leading edge 93 and a downstream or trailing edge 94. A chamber 97 is defined radially inward of the blade outer air seal 107 and vanes 106, and includes the products of combustion which are at a pressure $P_1$.

The blade outer air seal 107 is shown to have mount hooks 108 defining an intermediate chamber 110. The supply of cooling air 112 moves into the chamber 110 and communicates with a cooling air circuit 116 in a body of the blade outer air seal 107, shown schematically. Similarly, there may be cooling channels 114 receiving a supply of cooling air 112 in the stator vane 106. A supply of cooling air 112 is from the compressor section of the gas turbine engine shown in FIG. 1 and will be at a relatively high pressure $P_2$. Since $P_2$ is much higher than $P_1$ there will tend to be leakage of the cooling air from the radially outer side of the blade outer air seal 107 and the stator vane 106 into the chamber 97. This is inefficient and undesirable.

As such, a seal 118 is placed across an axial gap 117 between the blade outer air seal 107 and the stator vane 106. It should be understood that the terms "axially," "radially," and "circumferentially" are all defined relative to an axis of rotation X of the rotating turbine blades 102. The seal 118 is formed of thin sheet metal, and has a surface with two curved portions 120 and 122 and an intermediate central portion 121 which curves in a direction away from the curve of the end portions 120 and 122. As can be appreciated, the curve 120 seals against a surface 124 of the blade outer air seal 107 and the curve 122 seals against the surface 117 of the stator vane 106. The seal 118 is forced into contact with the surfaces 124 and 126 by the pressure differential between a chamber 99 that is radially outward of the seal 118, and the chamber 97.

As shown in FIG. 2B, the seal 118 has its curve 120 providing point contact at point 130 with the surface 124. In addition, the curve 122 defines a point contact 128 with the surface 126. The point contact is especially valuable because the blade outer air seal 107 and stator vane 106 may be formed of different material and in different thermal coefficients of expansion.

As one example, the blade outer air seal 107 may be formed of ceramic matrix composite ("CMCs") while the stator vane 106 may be formed of an appropriate metal.

In embodiments, the ceramic matrix components could be formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

Due to the different coefficients of thermal expansion, seal 118 and its point contact is particularly valuable as it can adjust to the thermal expansion of the two. As shown in FIG. 2C, the blade outer air seal is now radially outward of the stator vane 106. As illustrated, the seal 118 is able to pivot and the curves 120 and 122 still maintain point sealing contact at points 131 and 129, respectively.

It should be understood the stator vane 106 may expand radially outward of the blade outer seal. Either could expand more than the other for reasons beyond different coefficients of thermal expansion. As an example the different positioning may be due to part tolerances, thermal growth of attachment structure and other factors. The seal 118 will adjust to accommodate positioning change of either component for all these reasons.

FIG. 3 is a cross-sectional view along line 3-3 as shown in FIG. 2A. As shown, the seal 118 extends circumferentially between ends 140 and 142. There is a circumferential gap 144. Applicant has discovered the gap is desirable as otherwise the seal could "lift off" or become locked. A seal tab 146 spans the gap 144. The seal tab 146 is positioned outwardly of gap 144. While it may alternatively be inward, it is preferably only on one side.

The feather seal could be said to have two radially inward portions at each of two axial ends and a central portion 121 curved radially outwardly and connecting the two radially inward curved portion 120/122. The radially inwardly extending curved portion provides the point contact with the surfaces on the blade outer air seal and the stator vane.

Figure 4:
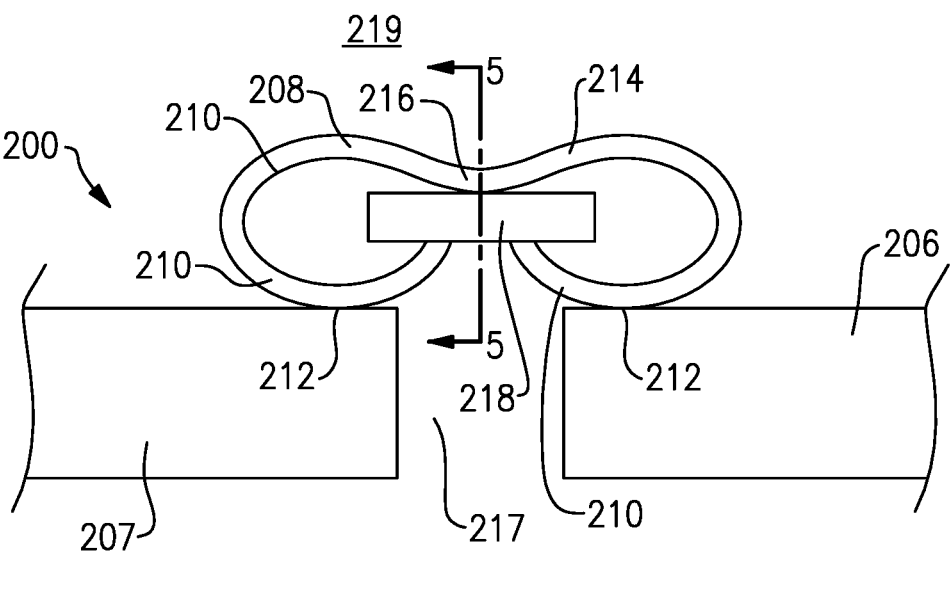
FIG. 4 shows an alternative embodiment.
Figure 5:
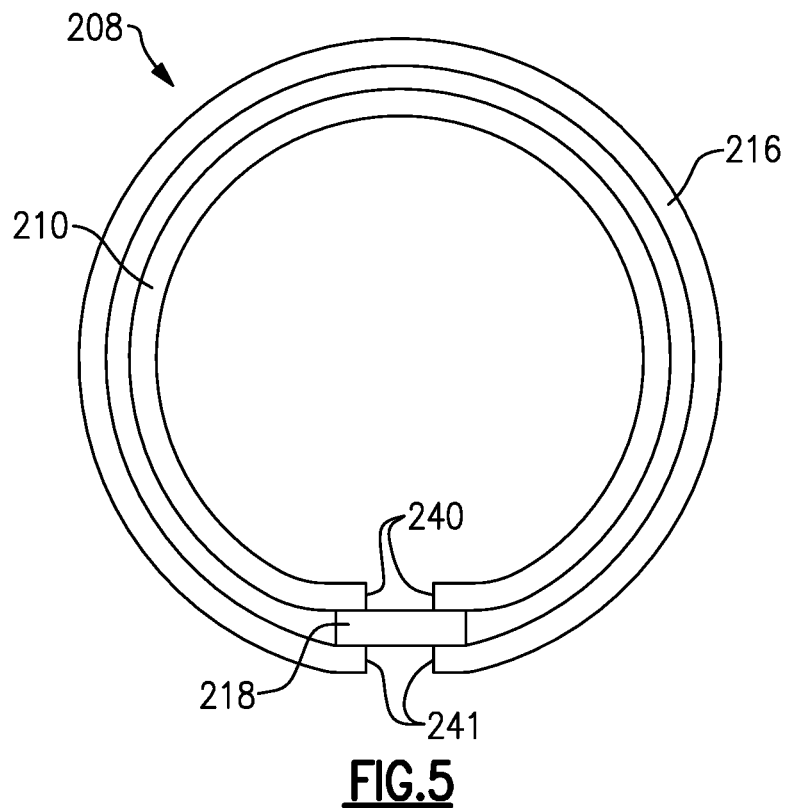
FIG. 5 is a cross-sectional view along line 5-5 of FIG. 4.

FIG. 4 shows an alternative embodiment 200. Here there is a seal 208 sealing between a blade outer air seal 207 and a stator vane 206. The seal 208 has two generally c-shaped end pieces 210 each defining a curve to have point contact 212 with the outer surface of the blade outer air seal 207 and stator vane 206. An intermediate curved portion 214 leads to a radially inwardly extending curve portion 216. A seal tab 218 spans a circumferential gap as shown in FIG. 5. Again, the pressure differential between the chambers 219/217 will force the entire seal inwardly creating point contact at contact points 212.

FIG. 5 shows the structure along line 5-5 as shown in FIG. 4. As can be appreciated, the seal tab 218 spans a gap between circumferential ends 241 of the portion 216 and ends 240 of the seal 208. Seal tab 218 is positioned across the gap. Only one seal tab is preferably used. As can be seen, the outer curved portion 216 is at least partially radially outward of the c-shaped portions, and the spaced ends of the c-shaped portions being radially inward of the outer curved portion Here again, and similar to the discussion above with regard to FIGS. 2B and 2C, if there is expansion of one of the BOAS or stator vane relative to the other, seal embodiment 208 can adjust. In the embodiment of FIGS. 2A-2C and FIG. 4, as is clear, the feather seals are not constrained at their radially outer extent, but rather are free to move. This enhances their ability to adjust for the changing positions of the BOAS and the stator vane.

The feather seal 208 could be said to have two mirrored generally c-shaped portions 210 providing a radially inwardly extending curve to contact the surfaces on the blade outer air seal and the stator vane. Ends of the c-shaped portions are spaced from each other, and connected by an outer curved portion 214 extending across a gap between the c-shaped mirrored portions and the outer curved portion having a generally radially inwardly extending portion 216.

While the adjustment may be due to the use of distinct materials, it may also be due to tolerances, vane twisting and/or lean from aero loading and other variables.

A gas turbine engine under this disclosure could be said to include a compressor, a combustor and a turbine section. The turbine section includes at least one row of turbine blades rotating about a rotational axis and at least one row of stator vanes axially spaced from the at least one row of turbine blades. A blade outer air seal is positioned radially outward of a radially outer tip of the at least one row of rotating turbine blades. Each of the blade outer air seals and the stator vanes have a leading edge and trailing edge. There is an axial gap between a leading edge of one of the blade outer air seals and the stator vanes and a trailing edge of the other. A feather seal is positioned to span the axial gap. The feather seal has axially spaced curved portions, with one of the curved portions in contact with a surface of the blade outer air seal and another of the curved portions being in contact with a surface of the stator vane. There is a connection to supply cooling air to a radially outer chamber radially outward of at least one of the blade outer air seal and the at least one row of stator vanes. There is a pressure differential between the radially outer chamber and a combustion products chamber radially inward of the blade outer air seal and the stator vanes. The pressure differential forces the feather seal into contact with the sealing surfaces on the blade outer air seal and stator vane. The contact is point contact due to the curved portion.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine comprising:

a compressor, a combustor and a turbine section, said turbine section including at least one row of turbine blades rotating about a rotational axis and at least one row of stator vanes axially spaced from said at least one row of turbine blades, and a blade outer air seal positioned radially outward of a radially outer tip of said at least one row of rotating turbine blades, each of said blade outer air seals and said stator vanes having a leading edge and trailing edge, and there being an axial gap between a leading edge of one of said blade outer air seals and said stator vanes and a trailing edge of the other;

a feather seal positioned to span said axial gap, said feather seal having axially spaced curved portions, with one of said curved portions in contact with a surface of said blade outer air seal and another of said curved portions being in contact with a surface of said stator vane; and a connection to supply cooling air to a radially outer chamber radially outward of at least one of said blade outer air seal and said at least one row of stator vanes, such that there would be a pressure differential between said radially outer chamber and a combustion products chamber radially inward of said blade outer air seal and said stator vanes, with the pressure differential forcing the feather seal into contact with the sealing surfaces on the blade outer air seal and stator vane, and the contact being point contact due to the curved portion;

wherein said blade outer air seal is formed of ceramic matrix composite; and the feather seals are not constrained at their radially outer extent, and are free to move.

2. A gas turbine engine comprising:

a compressor, a combustor and a turbine section, said turbine section including at least one row of turbine blades rotating about a rotational axis and at least one row of stator vanes axially spaced from said at least one row of turbine blades, and a blade outer air seal positioned radially outward of a radially outer tip of said at least one row of rotating turbine blades, each of said blade outer air seals and said stator vanes having a leading edge and trailing edge, and there being an axial gap between a leading edge of one of said blade outer air seals and said stator vanes and a trailing edge of the other;

a feather seal positioned to span said axial gap, said feather seal having axially spaced curved portions, with one of said curved portions in contact with a surface of said blade outer air seal and another of said curved portions being in contact with a surface of said stator vane;

a connection to supply cooling air to a radially outer chamber radially outward of at least one of said blade outer air seal and said at least one row of stator vanes, such that there would be a pressure differential between said radially outer chamber and a combustion products chamber radially inward of said blade outer air seal and said stator vanes, with the pressure differential forcing the feather seal into contact with the sealing surfaces on the blade outer air seal and stator vane, and the contact being point contact due to the curved portion;

said blade outer air seal is formed of ceramic matrix composite;

said stator vanes are formed of a metal such that said blade outer air seal and said stator vanes have a different thermal coefficients of expansion; and wherein the feather seals are not constrained at their radially outer extent, and are free to move.

* * * * *